J. F. GILMORE.
FRICTION GRAVITY DRIVE.
APPLICATION FILED APR. 10, 1913.
1,240,560.
Patented Sept. 18, 1917.
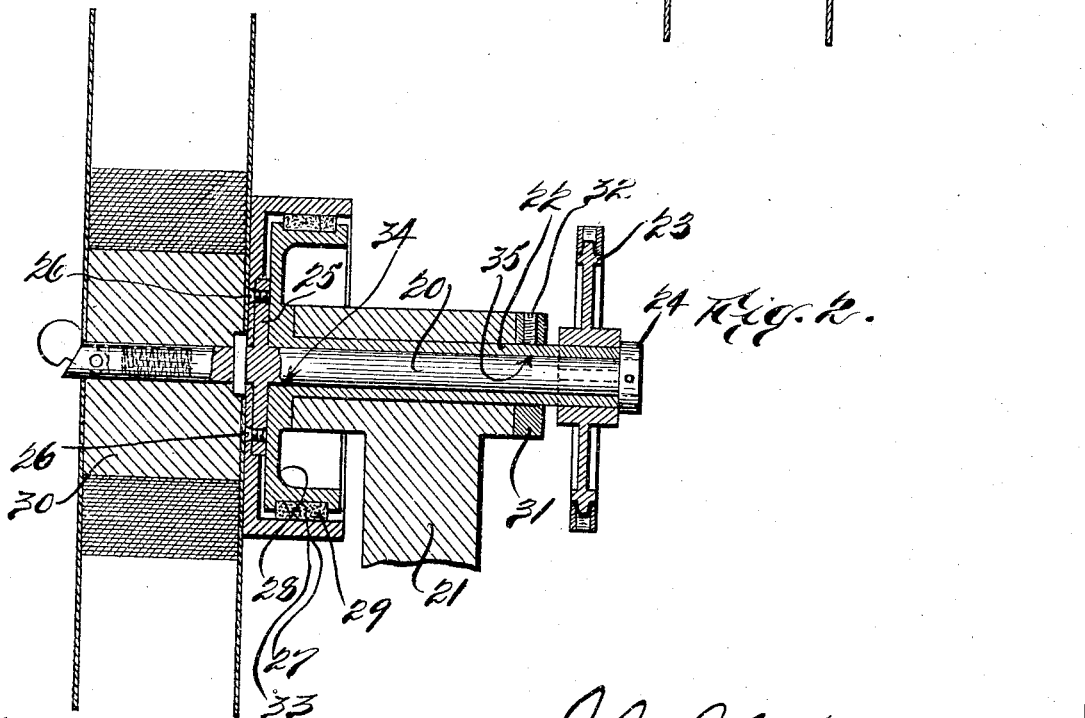

UNITED STATES PATENT OFFICE.

JOHN F. GILMORE, OF NEW YORK, N. Y.

FRICTION GRAVITY-DRIVE.

1,240,560.  Specification of Letters Patent.  Patented Sept. 18, 1917.

Application filed April 10, 1913. Serial No. 760,166.

*To all whom it may concern:*

Be it known that I, JOHN F. GILMORE, a citizen of the United States, residing at New York city, in the county and State of New York, have invented certain new and useful Improvements in Friction Gravity-Drives, of which the following is a clear, full, and exact description.

The object of this invention is to provide an improved friction gravity drive for mechanism for driving a part, such for example, as the reel, of a moving picture machine.

In carrying out the invention, the reel or other part is mounted on a spindle. The spindle is freely mounted in a rotating bushing. The bushing is rotated by any suitable driving mechanism so that due to the inertia of the spindle and loaded reel, they will turn with the bushing, but will be prevented from turning by the slightest impediment.

Inasmuch as the operation of such a gravity friction device is due in a measure to the weight of the mass being driven, it will be obvious that automatically the power will vary as the driven reel has more or less weight.

In my preferred form of this invention, I not only rely upon a simple bushing with one diameter of bore, and a plain spindle in the bore, but I provide annular flanges for the spindle, and annular flanges for the bushing, the surfaces of both annular flanges riding one on the other. This is to increase the co-efficient of drive by giving greater surfaces at a greater distance from the spindle for the tilting action of the weighted reel to act upon. It may be in some instances that the plain metal surfaces will not alone be relied upon, but that the flanges may carry leather or other frictional contact surfaces. The essential feature however, is that the spindle and reel are brought into contact with more or less force by means of the weight of the reel, and spindle itself, without the use of resilient take-ups and complicated brake shoes, such as are ordinarily used.

It will be seen that the device of my invention, if placed with the spindle in vertical line, may be so evenly balanced that the spindle will not be driven at all by a rapidly rotating sleeve, but if placed in a horizontal line, the weight of the spindle and reel will cause sufficient surface contact to carry the weighted reel and spindle around with the driving bushing.

The scope of my invention will be pointed out in the claims.

In the accompanying drawings:

Figure 1 is a vertical sectional side elevation of my preferred form of apparatus.

Fig. 2 is a similar view of the modified form.

As shown in the drawings, 1 is the standard in which there is carried a bushing 2 provided with a centrally bored pulley 3. They are fastened together by a set screw 4. The bushing 2 has a flanged extension 5. The flanged extension 5 and the pulley 3 each have a considerable outer bearing surface, one on its outside, the other on the inside of its bore. The spindle 6 carries the ordinary reel 7 at one end. It has a flanged portion 8 secured to it at one end by a set screw 9. The flanged portion 8 is adapted to closely and snugly fit in the bore of the pulley 3. At the other end of the spindle is a part 10 centrally bored to closely and snugly fit the flange 5 of the bushing. A set screw 11 serves to hold the part 10 on the spindle 6. A belt 12 or other device serves to rotate the bushing. It will be seen that the weight of the reel on the spindle will cause the upper surfaces at the points marked 13 and 14 of the flanged portions of the spindle to rest with the greatest pressure at these points upon the flanged portions of the bushing, and that this pressure will increase or decrease according to the weight of the spindle itself.

In Fig. 2 I have shown a modified form of device in which 20 is the spindle; 21 the bracket; 22 the bushing; 23 a gear wheel fast to the bushing 22; 24 is a cap pinned to the end of the spindle 20; 25 is a flanged projection on the spindle secured by screws 26 to a centrally bored part 27. Within the centrally bored part is a flanged portion 28 in one with the bushing 22, but of smaller diameter than the interior of the part 27. A friction surface 29 may be carried by the part 28 to bear against the part 27. 30 is the reel; 31 is a collar pinned by a set screw 32 to the bushing.

The weight of the reel in this case would bear with greatest force upon the leather part 29, while the spindle itself due to the weight of the reel would get metal to metal drive at the two points marked in arrows as 34, 35. In a device of this character the parts 27, 28 and 29 may be entirely done away with. The driving from the points 34 and 35, and their associated areas may be sufficient.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense.

It is furthermore desired to be understood that the language used in the following claims is intended to cover all the generic and specific features of the invention herein described, and all statements of the scope of the invention which as a matter of language might be said to fall therebetween.

I claim as my invention:

1. In a motion picture apparatus, a friction drive for a film take-up reel consisting of a continuously driven hollow shaft, a supporting frame therefor and a reel carrying spindle, said reel carrying spindle supported entirely by said hollow shaft and frictionally connected therewith as and for the purpose described.

2. In a motion picture apparatus, a film take-up device consisting of a constantly driven tubular spindle, a supporting frame therefor, a film reel carrying a spindle freely mounted in said tubular spindle, a friction cup fastened on said reel spindle, a friction cup fastened on said constantly driven tubular shaft, said friction cup fastened on said reel spindle engaging on its surface with said friction cup, which is fastened on said constantly driven tubular shaft, substantially as described.

3. In a motion picture apparatus, a film winding device consisting of a constant speed tubular shaft, a reel carrying shaft, said shaft being loosely mounted in said tubular shaft and supported entirely thereby, and a frame support for said tubular shaft, as and for the purpose described.

4. In a motion picture apparatus, a film winding device consisting of a constantly driven tubular shaft, a film reel shaft supported thereby, contact cups with friction surfaces mounted on said shafts, and a supporting frame for the tubular shaft, said tubular shaft driving the reel shaft controlled by the gravity contact between the friction cups, substantially as described.

Signed at New York city, New York, this 5th day of April, 1913.

JOHN F. GILMORE.

Witnesses:
 FRED FRANCIS WEISS,
 F. WARREN WRIGHT.